United States Patent

Shapcott

[11] 3,880,012
[45] Apr. 29, 1975

[54] INTEGRAL SHADED AREA ON SINGLE MARK VESSEL TO AID IN VIEW OF MENISCUS

[75] Inventor: Bryan Percy Shapcott, Barnsley, England

[73] Assignee: Wood Brothers Glass Company Limited, Barnsley, England

[22] Filed: June 5, 1972

[21] Appl. No.: 259,612

[52] U.S. Cl. ............ 73/426; 23/292; 350/110
[51] Int. Cl. .................................. G01j 19/00
[58] Field of Search ........ 73/426, 429; 116/129 K; 350/110, 116; 23/292; 356/246; 215/7

[56] References Cited
UNITED STATES PATENTS

| | | | |
|---|---|---|---|
| 431,132 | 7/1890 | Wharton | 23/292 |
| 514,426 | 2/1894 | Outerbridge, Jr. | 23/292 |
| 1,507,968 | 9/1924 | Johnson | 73/427 |
| 1,635,479 | 7/1927 | Hutchinson | 116/129 K |
| 1,711,796 | 5/1929 | Knight | 73/427 |
| 2,000,419 | 5/1935 | Sarber | 73/427 |
| 3,045,495 | 7/1962 | Spencer et al. | 73/427 |
| 3,512,862 | 5/1970 | Yin | 73/428 |

OTHER PUBLICATIONS

Publication: "Determination" and Definition of Capacity, National Physical Laboratory, pp. 9, 10, 1960 G. Britain.

Primary Examiner—Richard C. Queisser
Assistant Examiner—Daniel M. Yasich
Attorney, Agent, or Firm—Norris & Bateman

[57] ABSTRACT

The invention relates to a graduated measuring vessel or flask of glassware or like transparent material having a single volume mark formed with a graduation line to show the measured volume of liquid in the vessel and with a permanent dark area not more than 1 mm below the graduation line to reflect a dark shading onto the underside of the meniscus of the measured volume to enable the meniscus to be viewed more clearly against a white background.

3 Claims, 2 Drawing Figures

INTEGRAL SHADED AREA ON SINGLE MARK VESSEL TO AID IN VIEW OF MENISCUS

This invention relates to improvements in or relating to the marking of graduated volumetric measuring vessels or flasks of glassware or like transparent materials having a single volume marking thereon.

A liquid level indicator in which the height of the surface of a liquid in a transparent container is read on a vertical scale has been proposed in which a coloured surface is provided in such a position substantially vertically above or below the liquid surface that the colour can be viewed in the plane of the liquid surface by reflection at the meniscus of the liquid surface.

According to the invention a graduated measuring vessel or flask of glassware or like transparent material of the one mark type formed with a graduation line to show the measured volume of liquid in the vessel and with a permanent dark area not more than 1 mm. below the graduation line to reflect a dark shading onto the underside of the meniscus of the measured volume of the liquid to enable the meniscus to be viewed more clearly against a white background.

An embodiment of the invention will be described with reference to the accompanying drawings.

Figure 1:
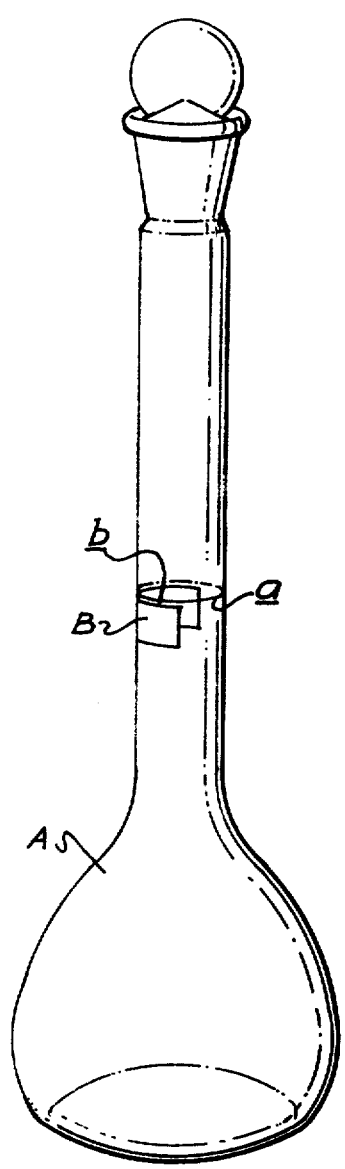
FIG. 1 is a perspective view of a measuring vessel.
Figure 2:
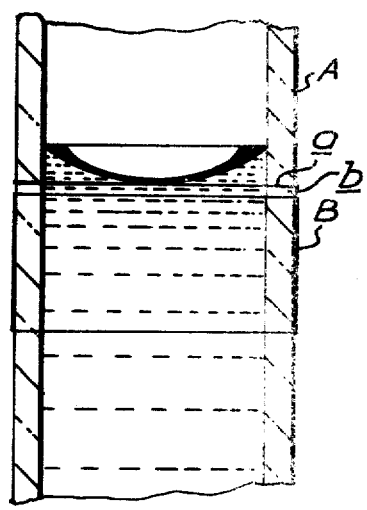
FIG. 2 is an enlarged detail view of part of the neck of same.

The vessel A is graduated in known manner and a permanent area B of black or a dark shade is applied to the vessel not more than a space *b* of 1 mm. below the graduation line *a*. This dark area B reflecting a dark shading onto the underside of the meniscus of the liquid gives a clear, accurate and constant position of the meniscus in relation to the graduation line *a* when the maniscus is viewed against a white background.

The permanent dark area B may be applied by any suitable known method and be of any material, for example vitrous enamel, which will adhere to glass.

This dark area B may be applied in the form of a continuous band around the vessel or occupy only a part of the circumference dependent on the requirements.

What I claim is:

1. A graduated measuring vessel of relatively clear glass or other transparent relatively light colored material, the invention comprising a single volume mark vessel having a cylindrical neck through which liquid is introduced and which is of minor diameter as compared to the body of the vessel so that when the vessel is filled with liquid a slender column of liquid extends into said neck with a relatively small diameter meniscus at the top, a single graduation line extending around said neck to show the measured volume of liquid in the vessel and a permanent integral dark area of preselected length and width dimensions extending around at least a portion of said neck in predetermined spaced relation to but not more than 1 millimeter below the graduation line, the top edge of said dark area being precisely parallel to said graduation line, whereby said dark area imparts a predetermined, undeviating dark shading to the curved underside of the meniscus within said neck to enable the meniscus to be viewed more clearly against the light background of the vessel material.

2. A one mark graduated measuring vessel as in claim 1 in which the permanent dark area is a vitreous enamel coating.

3. A one mark graduated measuring vessel as in claim 1, wherein said dark area is a relatively wide band extending substantially parallel to the graduation line through an arc materially less than a complete circumference thereby defining between the ends of the band a delineated viewing portal for unobstructed eye level sighting of the meniscus relative to the graduation line.

* * * * *